E. PARKER.
Coffee Mill.
No. 33,599.
Patented Oct. 29, 1861.
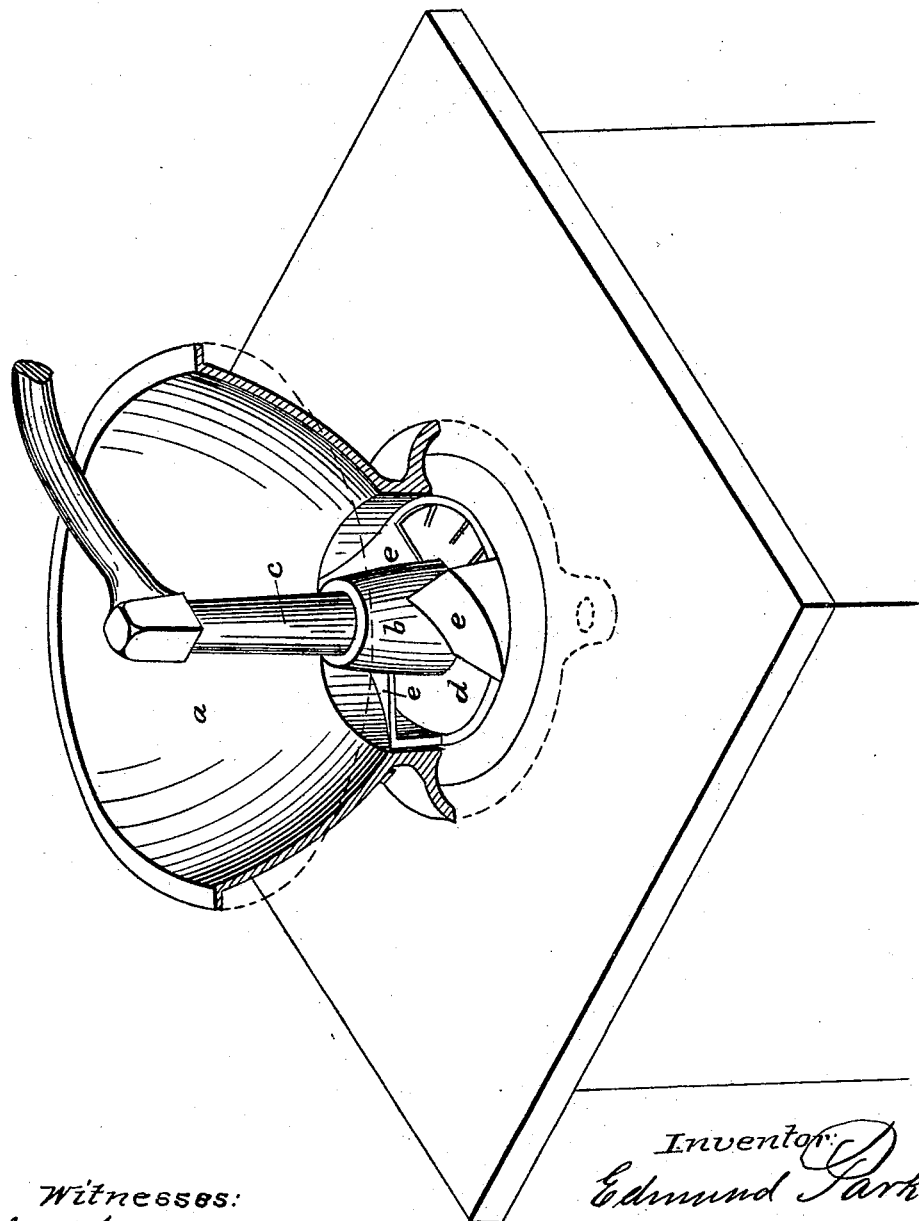

UNITED STATES PATENT OFFICE.

EDMUND PARKER, OF MERIDEN, CONNECTICUT.

IMPROVEMENT IN COFFEE-MILLS.

Specification forming part of Letters Patent No. 33,599, dated October 29, 1861.

*To all whom it may concern:*

Be it known that I, EDMUND PARKER, of Meriden, in the county of New Haven and State of Connecticut, have invented a new and useful Improvement in Coffee-Mills; and I do hereby declare that the following is a full, clear, and exact description of the same, reference being made to the annexed drawing, making a part of this specification.

Similar letters indicate similar parts throughout.

My improvement in coffee-mills consists in the peculiar form of the cross-braces which support the box through which the spindle attached to the revolving grinder passes.

The object for giving the peculiar form is for the purpose of facilitating the grinding, in that they are designed to act as guides or chutes to conduct the grains upon the revolving grinder in the first instance; secondly, to act as a cracker, and, thirdly, as a guard to prevent the throwing out of the grains from the hopper by the rebound of those which only get slightly nipped as they are entering the grinding-surfaces.

In the old mills it is well known that as the hoppers become partially emptied the coffee is constantly thrown out in this way, and it is almost impossible to get the last grains through at all, as they roll over and over until by chance falling into a favorable position to get the first nip and thereby become cracked, all which defects my improved guide-brace overcomes, as a single grain is as readily ground as when the hopper is full. The plan exhibits a mill of the box kind, the hopper $a$ in section to show the construction of the braces. At $b$ is the spindle-box, and at $c$ is the spindle, and at $d$ so much of the surface of the revolving grinder as may be seen through the openings. At the letter $e$ are represented the cross-braces. These are cast radially in connection with the spindle-box and in the form of flaring plates or wings inclined to the surface of the grinder $d$, as shown. In the plan of mill here described the fixed grinder, the braces, and box $b$ form one casting.

The operation is as follows: The coffee being thrown into the hopper falls upon the revolving grinder through the spaces between the inclined braces, and being carried along by the grinder readily passes underneath them at their highest part, the grains being broken and crushed as soon as they reach a space between the inclined surface $e$ and the grinder narrow enough to enable the latter to take hold, the fragments then easily passing between both grinders and the operation is then completed in the usual manner, the grinding going on uninterruptedly until the last grain is passed through and without any rebounding or flying up of the same.

I claim—

Making the braces which support the spindle-box in the form of wings or inclined plates to form guides, and to cover the coffee or other grains and to assist in cracking the same before passing between the two grinders, substantially as described.

In testimony whereof I have hereunto subscribed my name.

EDMUND PARKER.

Witnesses:
J. P. PIRSSON,
S. H. MAYNARD.